United States Patent
Gan et al.

(10) Patent No.: US 12,219,393 B2
(45) Date of Patent: Feb. 4, 2025

(54) SYSTEMS AND METHODS FOR DETERMINING LOADS OF BASE STATIONS FOR CONNECTION WITH FIXED WIRELESS ACCESS DEVICES

(71) Applicant: Verizon Patent and Licensing Inc., Basking Ridge, NJ (US)

(72) Inventors: Seng Gan, Ashburn, VA (US); Muhammad Ebad Ullah, Allen, TX (US); Timothy E. Coyle, Chicopee, MA (US); Andrew F. Patka, Holliston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 418 days.

(21) Appl. No.: 17/808,821

(22) Filed: Jun. 24, 2022

(65) Prior Publication Data
US 2023/0422094 A1    Dec. 28, 2023

(51) Int. Cl.
*H04W 28/08* (2023.01)
*H04W 28/086* (2023.01)
*H04W 76/10* (2018.01)

(52) U.S. Cl.
CPC ....... *H04W 28/0861* (2023.05); *H04W 76/10* (2018.02)

(58) Field of Classification Search
CPC .......................... H04W 28/0861; H04W 76/10
See application file for complete search history.

(56) References Cited

U.S. PATENT DOCUMENTS

| 11,985,589 | B2 * | 5/2024 | Zong | H04W 48/18 |
| 2019/0261233 | A1 * | 8/2019 | Duan | H04W 36/0072 |
| 2023/0068860 | A1 * | 3/2023 | Sun | H04W 72/23 |

* cited by examiner

*Primary Examiner* — Luat Phung

(57) ABSTRACT

A management system may receive base station information regarding 5G base stations identified by a fixed wireless access (FWA) device. The base station information may identify the 5G base stations and sectors of the 5G base stations. The management system may provide a request for a quantity of devices connected to each of the sectors. The management system may receive device information indicating the quantity of devices connected to each sector of the sectors of the 5G base stations. The management system may determine loads of the 5G base stations based on the device information. The management system may provide load information regarding the loads of the 5G base stations. The load information may be provided to cause a 4G base station to determine the loads of the 5G base stations prior to causing a 5G base station to establish a connection with the FWA device.

20 Claims, 8 Drawing Sheets

SYSTEMS AND METHODS FOR DETERMINING LOADS OF BASE STATIONS FOR CONNECTION WITH FIXED WIRELESS ACCESS DEVICES

BACKGROUND

A base station (e.g., an eNodeB and/or a gNodeB, among other examples) is a hardware component that connects a core network to an end user mobile device (e.g., a user equipment (UE)). In some situations, the base station may establish a connection with a fixed wireless access device to provide Internet access to user devices connected to the fixed wireless access device.

DETAILED DESCRIPTION OF PREFERRED EMBODIMENTS

Figure 1A:
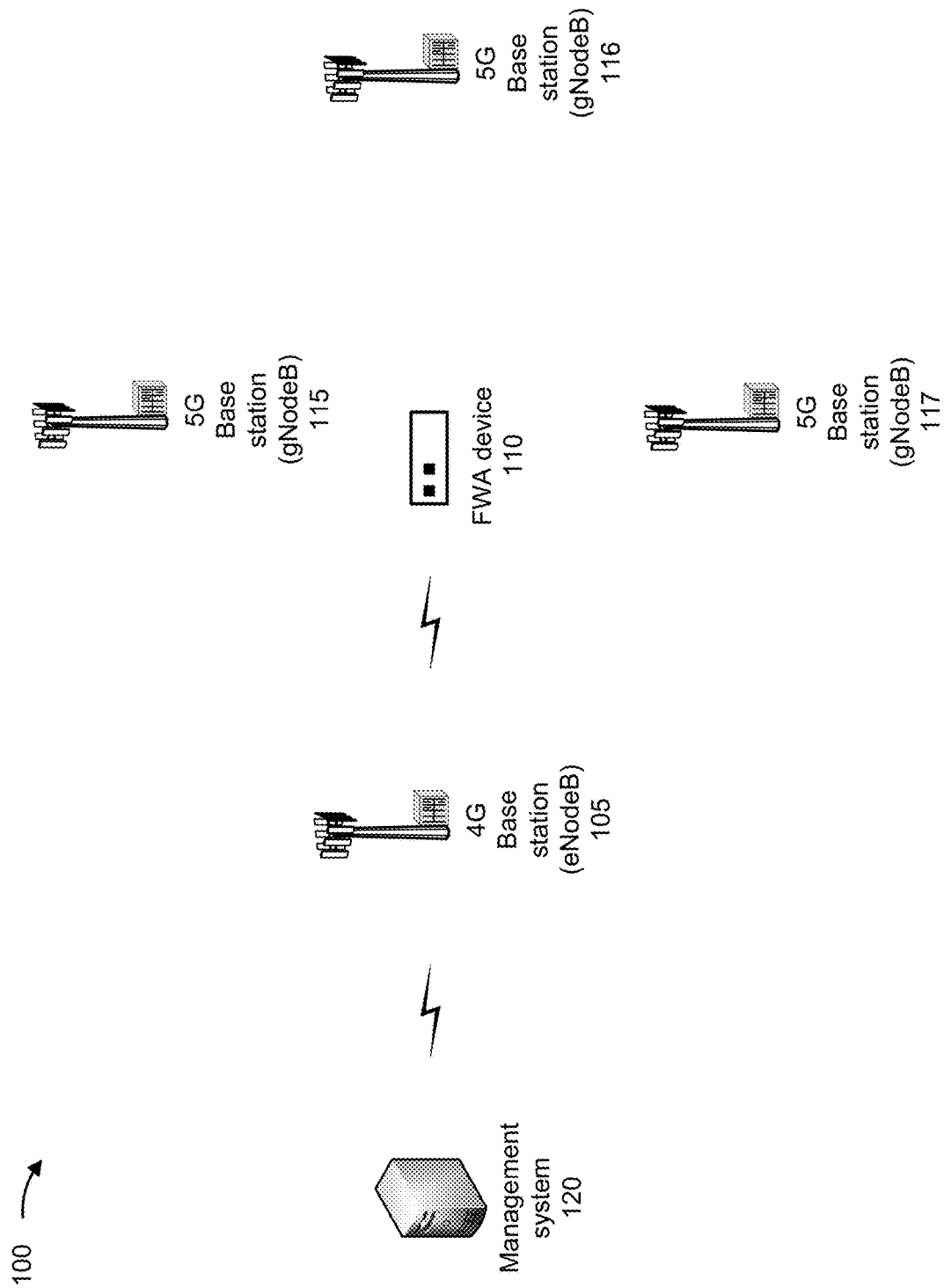
FIGS. 1A-1E are diagrams of an example associated with determining loads of 5G base stations (gNodeBs) that are to be connected to fixed wireless access devices.

The following detailed description of example implementations refers to the accompanying drawings. The same reference numbers in different drawings may identify the same or similar elements.

A base station may operate in accordance with a fifth generation (5G) standalone architecture (SA). The base station may include a gNodeB and may hereinafter be referred to as "5G base station." A mobile device may establish a connection with the 5G base station based on a signal strength and/or a frequency band of the 5G base station. Due to the concept of mobility of 5G SA, the mobile device may establish the connection with the 5G base station irrespective of a load associated with the 5G base station. The mobile device may establish the connection with the 5G base station because the connection is temporary. For example, the connection may be established for a second or less. Because the connection is temporary, the load associated with the 5G base station may not affect data received by the mobile device via the 5G base station.

In a 5G non-standalone architecture (NSA), a fixed wireless access (FWA) device may establish a connection with a base station. The base station may operate in accordance with fourth generation (4G) long term evolution (LTE). The base station may include an eNodeB and may hereinafter be referred to as "4G base station." The FWA device may be provided on a customer premises. The FWA device may establish the connection with the 4G base station to enable the 4G base station to provide Internet access to the FWA device (e.g., based on an Internet service subscription associated with the FWA device).

Because 5G NSA currently operates based on the concept of mobility of 5G NA, the 4G base station (to which the FWA device is connected) may cause a 5G base station, of the plurality of 5G base stations, to establish a connection with the FWA device irrespective of a load associated with the 5G base station. The 4G base station may cause the 5G base station to establish the connection based on the signal strengths of the 5G base stations (determined by the FWA device) and/or based on a priority associated with frequency bands associated with the 5G base stations. The 4G base station may cause the 5G base station to establish the connection to enable the 5G base station to act as a secondary source (or secondary node) with respect to the provisioning of Internet access to the FWA device.

Due lack of mobility, the FWA device may remain connected to the 4G base station and to the 5G base station for a long period of time (e.g., for multiple months until the Internet service subscription is terminated). In some situations, the 5G base station may become overloaded. As a result of the 5G base station becoming overloaded, a measure of speed of the Internet service may be degraded.

Based on the measure of speed of the Internet service being degraded, the FWA device may attempt to reboot and/or to perform a re-configuration multiple times. Additionally, or alternatively, based on the connection being terminated, the FWA device may attempt, multiple times, to reconnect to the 5G base station. Rebooting, performing the re-configuration, and attempting to reconnect in this manner may consume network resources and/or computing resources, among other resources.

Implementations described herein are directed to determining a load of a 5G base station prior to causing the 5G base station to connect to an FWA device. For example, a management system may receive a request for load information regarding 5G base stations. The management system may receive the request (e.g., from a 4G base station) after the 4G base station initially establishes a connection with the FWA device. The connection may be an initial connection with the FWA device. The request may include base station information identifying the 5G base stations and identifying sectors of the 5G base stations.

Based on the base station information, the management system may obtain (e.g., from the 5G base stations) device information indicating devices connected to each sector of the sectors identified in the device information. Based on the device information, the management device may determine loads of the 5G base stations. The management system may provide (e.g., to the 4G base station) load information identifying the loads of the 5G base stations. In some situations, information identifying the 5G base stations, in the load information, may be ranked based on the load of each 5G base station.

The 4G base station may receive the load information and cause one or more of the 5G base stations to connect with the FWA device based on the load information. For example, the 4G base station may cause the one or more 5G base stations to connect with the FWA device in an order that is based on a ranking of the 5G base stations. For instance, the 5G base stations may be ranked in an order that is based on the loads of the 5G base stations.

By causing the one or more 5G base stations to connect with the FWA device based on the loads of the 5G base stations, implementations described here may preserve the network resources and/or the computing resources, among other resources that would have otherwise been used to reboot the FWA device, perform a re-configuration of the FWA device, and/or attempt to reconnect the FWA device to a 5G base station.

FIGS. 1A-1E are diagrams of an example 100 associated with determining loads of 5G base stations (e.g., gNodeBs) that are to be connected to fixed wireless access devices. As shown in FIGS. 1A-1E, example 100 includes a 4G base station 105, an FWA device 110, a plurality of 5G base stations (e.g., 5G base station 115, 5G base station 116, and/or 5G base station 117), and a management system 120. 4G base station 105 may include an eNodeB.

FWA device 110 may include a communication device and a computing device. For example, FWA device 110 may include a customer premises equipment (CPE), an antenna, a transceiver, and/or a router, among other examples. FWA device 110 may be configured to establish a connection with a base station to provide Internet access to mobile devices connected with FWA device 110. The mobile devices may include a mobile phone, a user equipment, a laptop computer, a tablet computer, and/or a desktop computer, among other examples.

In some implementations, a 5G base station may include a gNodeB. A 5G base station may be associated with multiple sectors corresponding to respective antennas, of the 5G base station, that are facing in respective directions.

Management system 120 may include one or more devices configured to determine a load of a 5G base station and provide load information, regarding the load of the 5G base station, to 4G base station 105. In some situations, 4G base station 105 may maintain an anchoring relationship with respect to the 5G base stations. In other words, 4G base station 105 may be configured to cause the 5G base stations to establish a connection with FWA device 110 based on the load information.

In this regard, 4G base station 105 may use the load information to determine whether to cause a 5G base station 115 to establish the connection with FWA device 110, as explained herein. 4G base station 105 may be configured to cause the 5G base stations to establish the connection in order to increase bandwidth associated with FWA device 110 (e.g., with respect to Internet access).

Figure 1B:
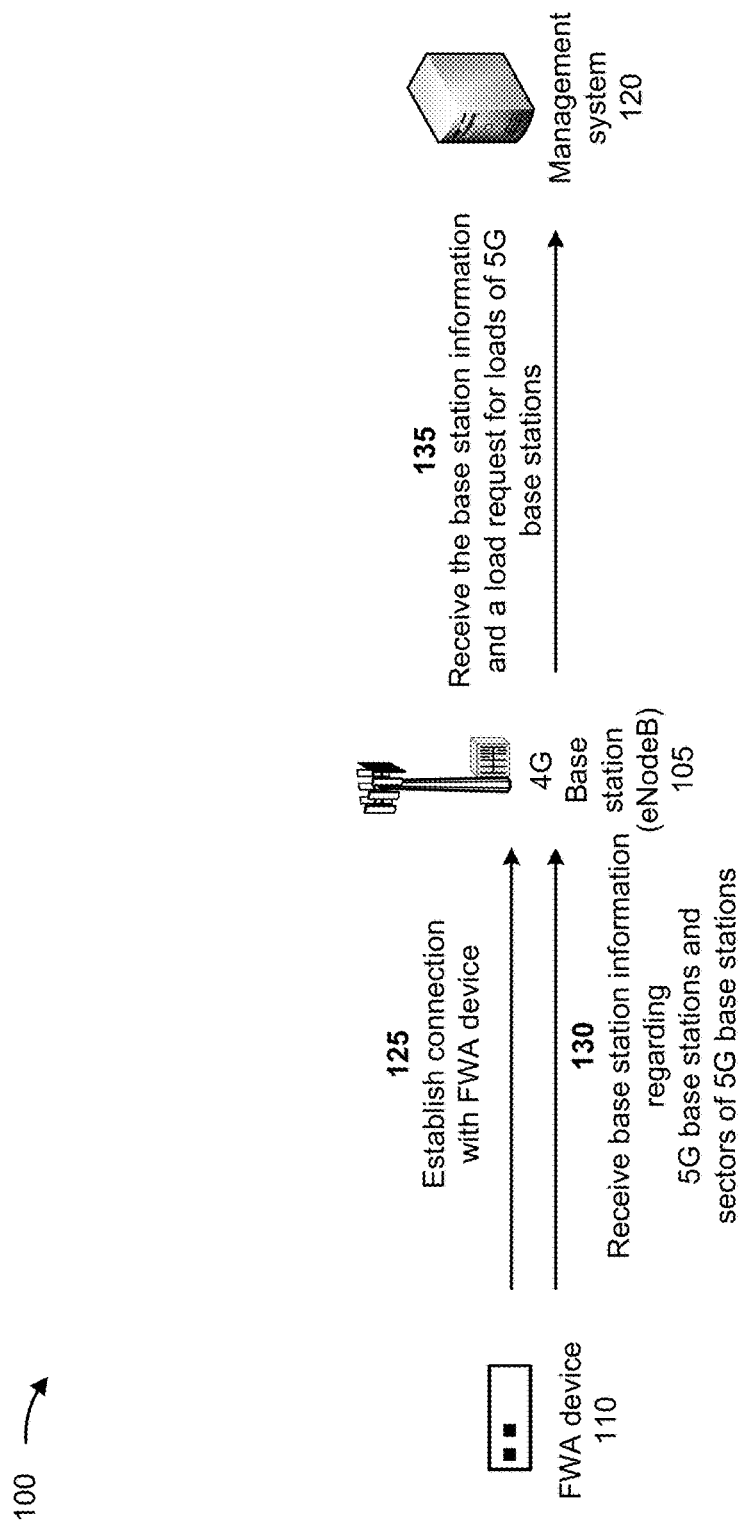

As shown in FIG. 1B, and by reference number 125, 4G base station 105 may establish a connection with FWA device 110. For example, FWA device 110 may be configured to provide a request, to 4G base station 105, to establish a connection. Accordingly, upon being initialized, FWA device 110 may provide the request to establish the connection with 4G base station 105. Based on receiving the request from FWA device 110, 4G base station 105 may establish the connection with FWA device 110.

As shown in FIG. 1B, and by reference number 130, 4G base station 105 may receive base station information regarding 5G base stations and sectors of 5G base stations. In some implementations, FWA device 110 may be configured to provide the base station information to 4G base station 105 after establishing the connection with 4G base station 105 (e.g., after establishing an initial connection with 4G base station 105). In this regard, 4G base station 105 may receive the base station information from FWA device 110 after establishing the connection with FWA device 110.

In some examples, when installed at a customer premises, an antenna of FWA device 110 may be directed toward one or more sectors of a 5G base station. For instance, FWA device 110 may be directed toward a first sector of 5G base station 115, toward a second sector of 5G base station 116, toward a third sector of 5G base station 117, among other examples. In this regard, the base station information may include information identifying 5G base station 115, information identifying the first sector, information identifying 5G base station 116, information identifying the second sector, and so on.

By way of example, the information identifying 5G base station 115 may include a serial number of 5G base station 115, and/or a location (e.g., geographical coordinates) of 5G base station 115, among other examples. By way of example, the information identifying the first sector may include information identifying an antenna of 5G base station 115.

In some implementations, FWA device 110 may be configured to determine signal strengths of the 5G base stations, upon FWA device 110 being initialized. For example, FWA device 110 may determine a first signal strength of 5G base station 115, determine a second signal strength of 5G base station 116, determine a third signal strength of 5G base station 117, and so on. In this regard, the base station information may include signal strength information identifying signal strengths of the 5G base stations. In some examples, 4G base station 105 may use the signal strength information to determine whether to cause a particular 5G base station to establish a connection with FWA device 110, as explained herein.

As shown in FIG. 1B, and by reference number 135, management system 120 may receive the base station information and a load request for loads of the 5G base stations. The load request may include the base station information. For example, management system 120 may receive, from 4G base station 105, the load request for the loads of the 5G base stations identified by FWA device 110. In some implementations, 4G base station 105 may be configured to provide the load request based on receiving the base station information from FWA device 110.

4G base station 105 may be configured to provide the load request in order to determine the loads of the 5G base stations identified by FWA device 110, prior to causing a particular 5G base station (identified by FWA device 110) to establish a connection with FWA device 110. For example, 4G base station 105 may be configured to use the load of the particular 5G base station and the signal strength of the particular 5G base station (identified by the signal strength information) to determine whether to cause the particular 5G base station to establish the connection with FWA device 110.

By using the load of the particular 5G base station in this manner, 4G base station 105 may prevent FWA device 110 from being connected to the particular 5G base station 115 when the load of the particular 5G base station satisfies a load threshold.

Figure 1C:
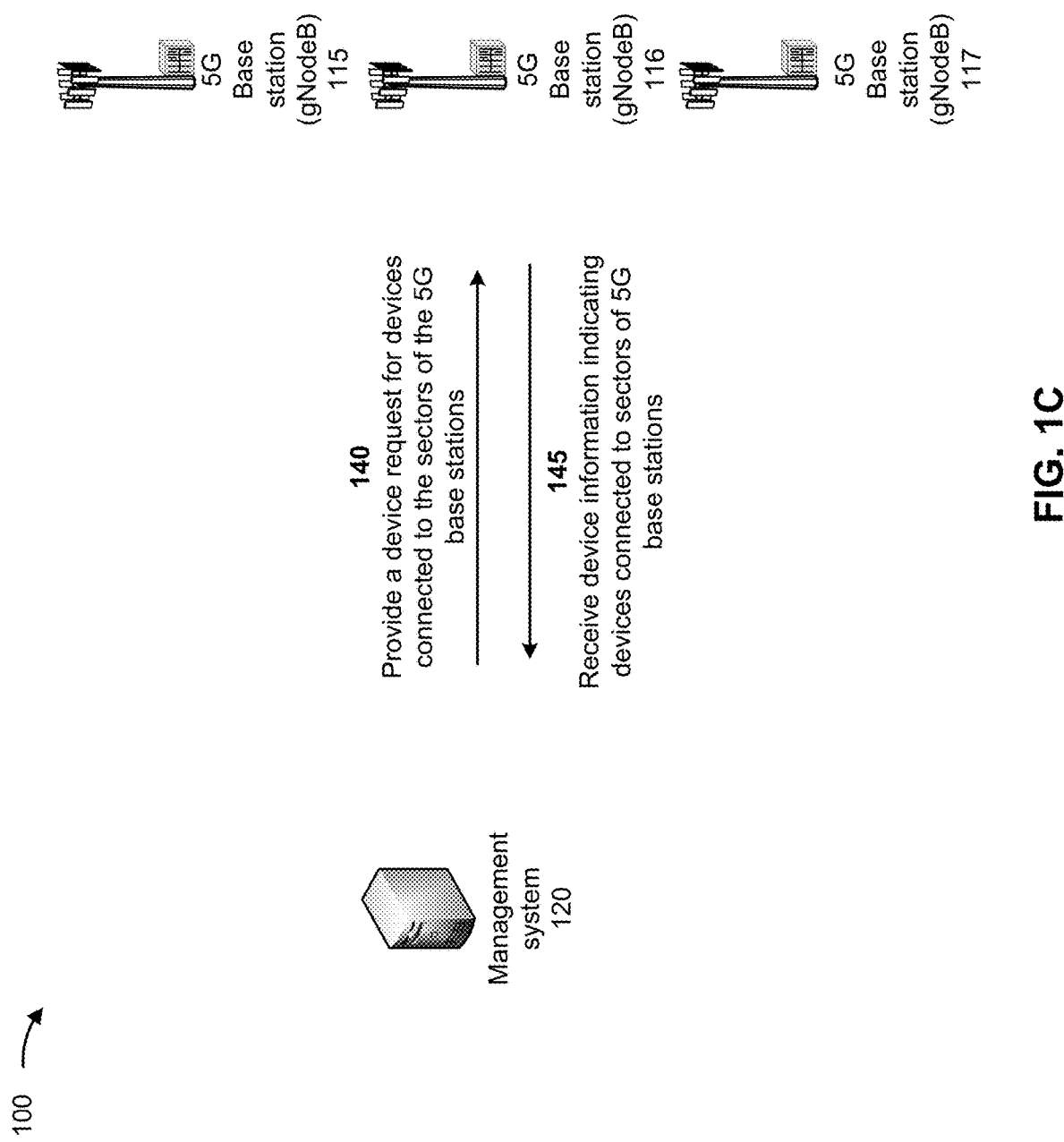

As shown in FIG. 1C, and by reference number 140, management system 120 may provide a device request for devices connected to the sectors of the 5G base stations. For example, based on receiving the load request for the loads of the 5G base stations, management system 120 may provide the device request to obtain information regarding the devices connected to the sectors, of the 5G base stations, identified in the load request.

In some implementations, management system 120 may provide a first device request to 5G base station 115, provide a second device request to 5G base station 116, provide a third device request to 5G base station 117, and so on. The first device request may include information identifying the first sector of 5G base station 115, the second device request may include information identifying the second sector of 5G base station 116, the third device request may include information identifying the third sector of 5G base station 117, and so on.

As shown in FIG. 1C, and by reference number 145, management system 120 may receive device information indicating devices connected to sectors of 5G base stations. For example, based on providing the device request, management system 120 may receive the device information indicating the devices connected to each sector of the sectors identified in the load request. In some implementations, management system 120 may receive the device information from the 5G base stations and/or from one or more network devices associated with the 5G base stations. For example, management system 120 may receive, from 5G base station 115, information indicating devices connected to the first sector; receive, from 5G base station 116, information indicating devices connected to the second sector; receive, from 5G base station 117, information indicating devices connected to the third sector, and so on.

In some implementations, the device information, for each sector, may indicate a quantity of devices connected to the sector, a type of device connected to the sector, and/or information identifying the devices, among other examples. For example, the device information, for each sector, may indicate a quantity of FWA devices connected to the sector and information identifying each FWA device (e.g., a serial number of each FWA device and/or a network address of each FWA device, among other examples).

Additionally, or alternatively, the device information, for each sector, may indicate a quantity of mobile devices currently connected to the sector, different quantities of mobile devices connected to the sector at different periods of time, and/or information identifying each mobile device. The information identifying a mobile device may include a mobile directory number of the mobile device, an international mobile equipment identity number of the mobile device, and/or a serial number of the mobile device, among other examples.

In some implementations, the device information may include information identifying a service plan associated with each FWA device. In some examples, the service plan, for a particular FWA device, may be a data plan and may indicate an amount of data allocated for the particular FWA device. In some implementations, the device information may include information identifying an amount of data consumed by each mobile device (e.g., over a period of time).

Figure 1D:
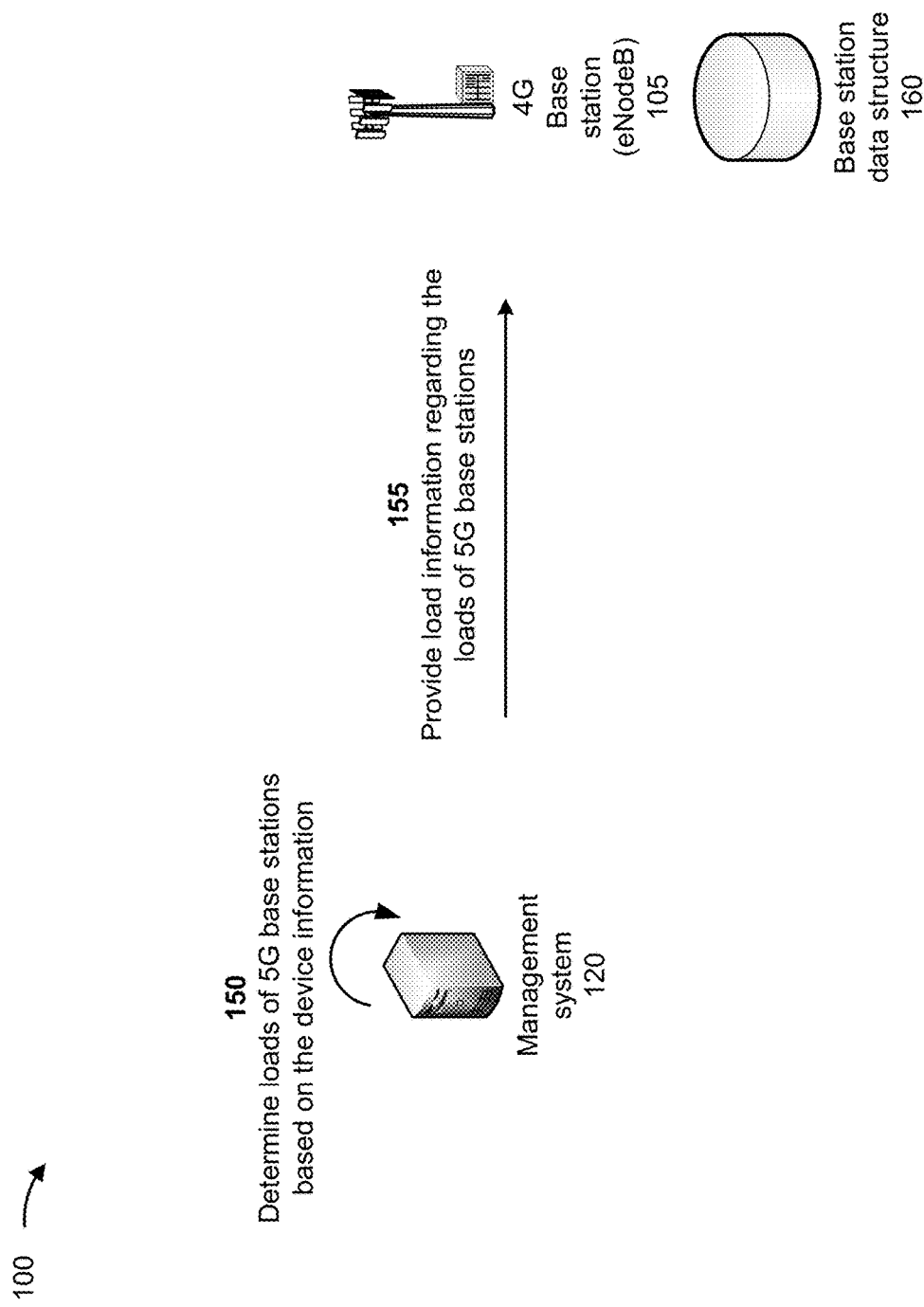

As shown in FIG. 1D, and by reference number 150, management system 120 may determine the loads of the 5G base stations based on the device information. For example, management system 120 may determine the load of 5G base station 115 based on information regarding the devices connected to the first sector as identified in the device information, determine the load of 5G base station 116 based on information regarding the devices connected to the second sector as identified in the device information, and so on.

In some implementations, management system 120 may determine the load of 5G base station 115 based on the quantity of FWA devices that are connected to the first sector and/or based on the quantity of mobile devices that are connected to the first sector. For example, management system 120 may determine the load of 5G base station 115 based on the quantity of FWA devices that are connected to the first sector. Additionally, or alternatively, management system 120 may determine the load of 5G base station 115 based on a quantity of FWA devices associated with each service plan and a factor associated with each service plan. In some examples, management system 120 may determine a factor, associated with a service plan, based on an amount of data associated with the service plan.

By way of example, management system 120 may determine the load of 5G base station 115 by determining a first value based on a first quantity of FWA devices associated with a first service plan and a factor determined based on the first service plan, determining a second value based on a second quantity of FWA devices associated with a second service plan and a factor determined based on the second service plan, and so on.

For instance, management system 120 may determine the first value by multiplying the first quantity of FWA devices and the factor determined based on the first service plan, determine the second value by multiplying the second quantity of FWA devices and the factor determined based on the second service plan, and so on. Management system 120 may determine the load of 5G base station 115 by combining the values (e.g., the first value, the second value, and so on) into a service plan value. For example, management system 120 may determine the load of 5G base station 115 by adding the values.

In some implementations, management system 120 may determine the load of 5G base station 115 based on the service plan value (described above) and the quantity of mobile devices connected to the first sector. For instance, management system 120 may determine the load of base station 115 by combining the service plan value (described above) and the quantity of mobile devices (e.g., a combination by way of an addition). In some examples, management system 120 may determine a moving average of the quantity of mobile devices based on the different quantities of mobile devices connected to the first sector at different periods of time. In this regard, management system 120 may determine the load of 5G base station 115 by combining the service plan value (described above) and the moving average of the quantity of mobile devices.

In some instances, management system 120 may determine a factor based on an amount of data consumed by each mobile device over a period of time (e.g., a combined total amount of data consumed by the mobile devices). Management system 120 may determine a particular value based on the factor and the moving average of the quantity of mobile devices. For example, management system 120 may determine the particular value by multiplying the factor and the moving average of the quantity of mobile devices. Management system 120 may determine the load of 5G base station 115 by combining the service plan value and the particular value (e.g., by way of adding the service plan value and the particular value).

While determining the load of 5G base station 115 has been described with respect to multiplication and addition, the load of 5G base station 115 may be determined using other mathematical operations or using a different combination of mathematical operations. Management system 120 may determine the loads of other 5G base stations in a manner similar to the manner described above in connection with 5G base station 115.

As shown in FIG. 1D, and by reference number 155, management system 120 may provide the load information regarding the loads of the 5G base stations. For example, after determining the loads of the 5G base stations, management system 120 may provide the load information regarding the loads of the 5G base stations. In some implementations, management system 120 may provide the load information to 4G base station 105. As an example, management system 120 may cause the load information to be stored in a base station data structure 160 of 4G base station 105. In this regard, 4G base station 105 may obtain the load information by performing a lookup of base station data structure 160. In some implementations, 4G base station 105 may be configured to analyze the load information and rank the 5G base stations in an order that is based on the loads of the 5G base stations. For example, 4G base station 105 may rank the 5G base stations in an order of increasing load (e.g., from least loaded to most loaded).

Additionally, or alternatively, management system 120 may provide the load information to a load management system data structure. For example, the load management data structure may be configured to store load information in association with information identifying a respective base station. 4G base station 105 may be configured to obtain the load information by performing a lookup of the load management data structure using information identifying 4G base station 105.

In some examples, 4G base station 105 may perform the lookup based on a trigger (e.g., a notification from management system 120 indicating that the load information has been stored). Additionally, or alternatively, 4G base station 105 may perform the lookup periodically (e.g., every minute, every five minutes, every ten minutes, among other examples). In some implementations, the 5G base stations, identified in the load information, may be ranked as described above.

Figure 1E:
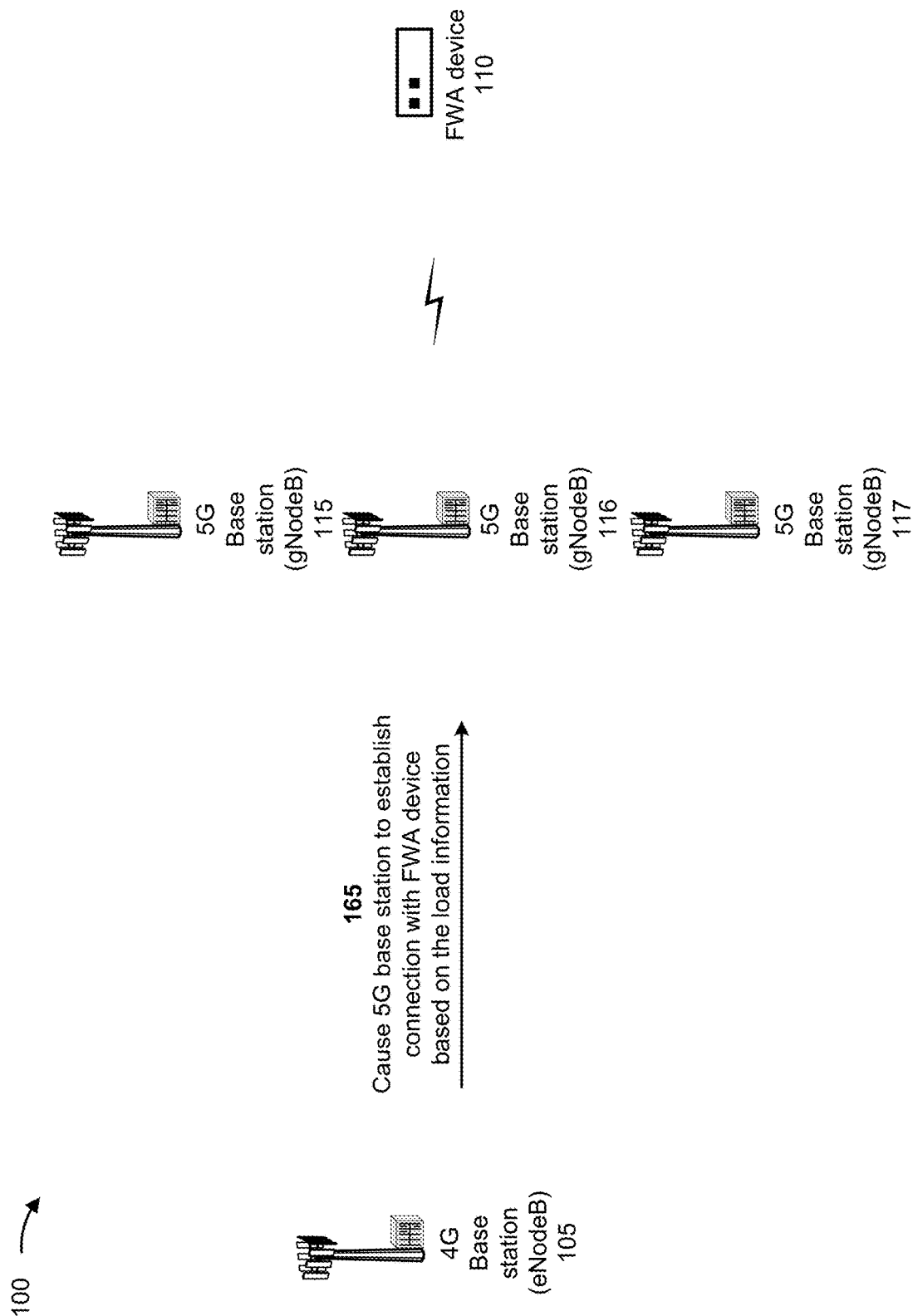

As shown in FIG. 1E, and by reference number 165, 4G base station 105 may cause 5G base station to establish a connection with FWA device 110 based on the load information. For example, 4G base station 105 may identify a first 5G base station of the ranked 5G base stations. For instance, 4G base station 105 may identify 5G base station 115 as a base station with a lowest load from the loads of the 5G base stations and may determine the signal strength of 5G base station 115.

If 4G base station 105 determines that the signal strength satisfies a signal strength threshold, 4G base station 105 may cause 5G base station 115 to establish the connection with FWA device 110. Alternatively, if 4G base station 105 determines that the signal strength does not satisfy the signal strength threshold, 4G base station 105 may identify a next 5G base station (of the ranked 5G base stations) and perform actions similar to the actions described in connection with 5G base station 115.

Implementations described herein are directed to determining a load of a 5G base station prior to causing the 5G base station to establish a connection with FWA device 110. The load level of the 5G base station may be used to optimize load balancing of traffic associated with FWA device 110 during a process of adding the 5G base station as a secondary node for the provisioning of Internet access. By causing the 5G base station to connect with FWA device 110 in this manner, implementations described here may preserve network resources and/or computing resources, among other resources that would have otherwise been used to reboot FWA device 110, perform a re-configuration of FWA device 110, and/or attempt to reconnect FWA device 110 to the 5G base station.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
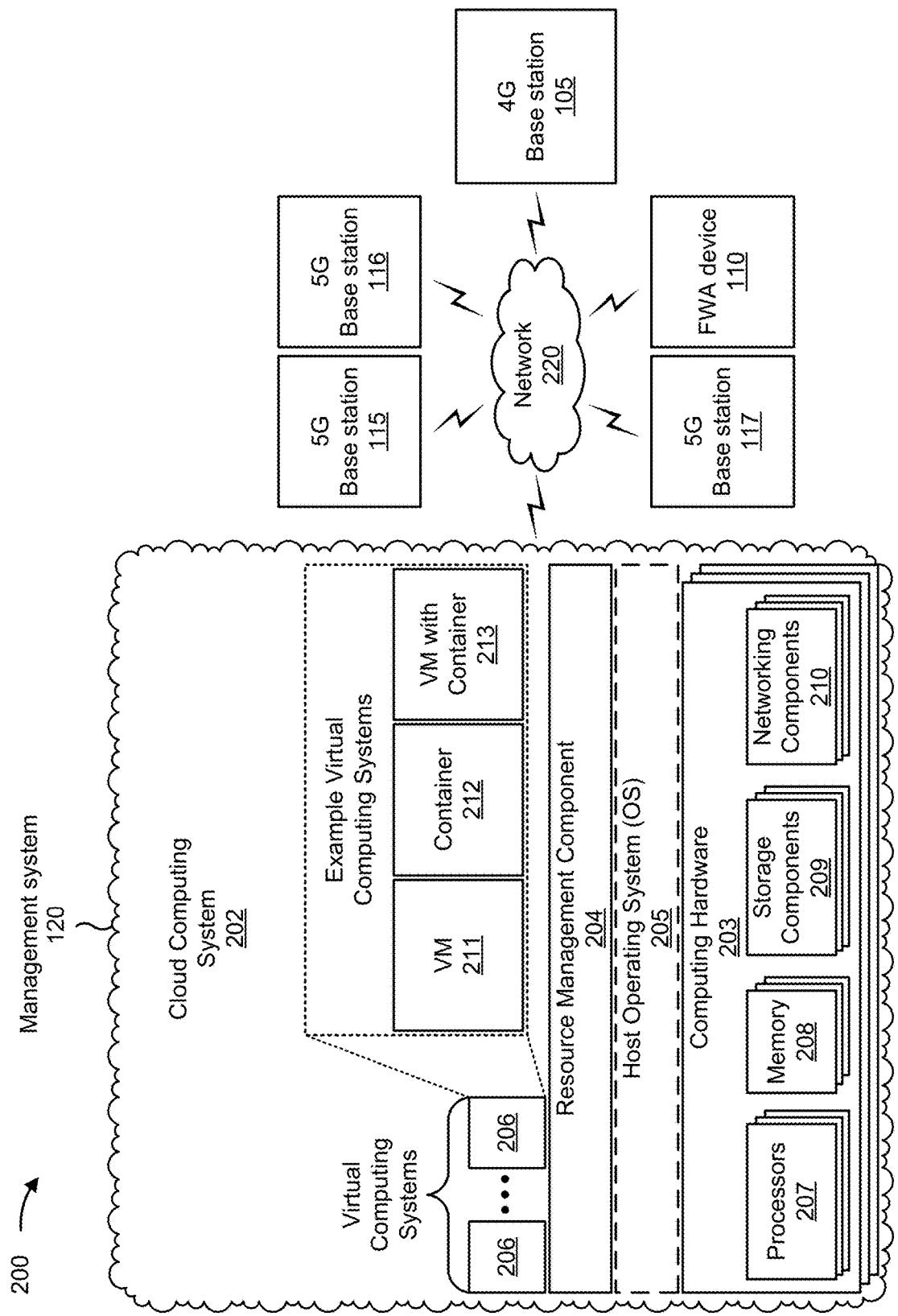
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a management system 120, which may include one or more elements of and/or may execute within a cloud computing system 202. The cloud computing system 202 may include one or more elements 203-213, as described in more detail below. As further shown in FIG. 2, environment 200 may include a network 220, 4G base station 105, FWA device 110, 5G base station 115, 5G base station 116, and/or 5G base station 117. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although management system 120 may include one or more elements 203-213 of the cloud computing system 202, may execute within the cloud computing system 202, and/or may be hosted within the cloud computing system 202, in some implementations, management system 120 may not be cloud-based (e.g., may be implemented outside of a cloud computing system) or may be partially cloud-based. For example, management system 120 may include one or more devices that are not part of the cloud computing system 202, such as device 300 of FIG. 3, which may include a stand-alone server or another type of computing device. Management system 120 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
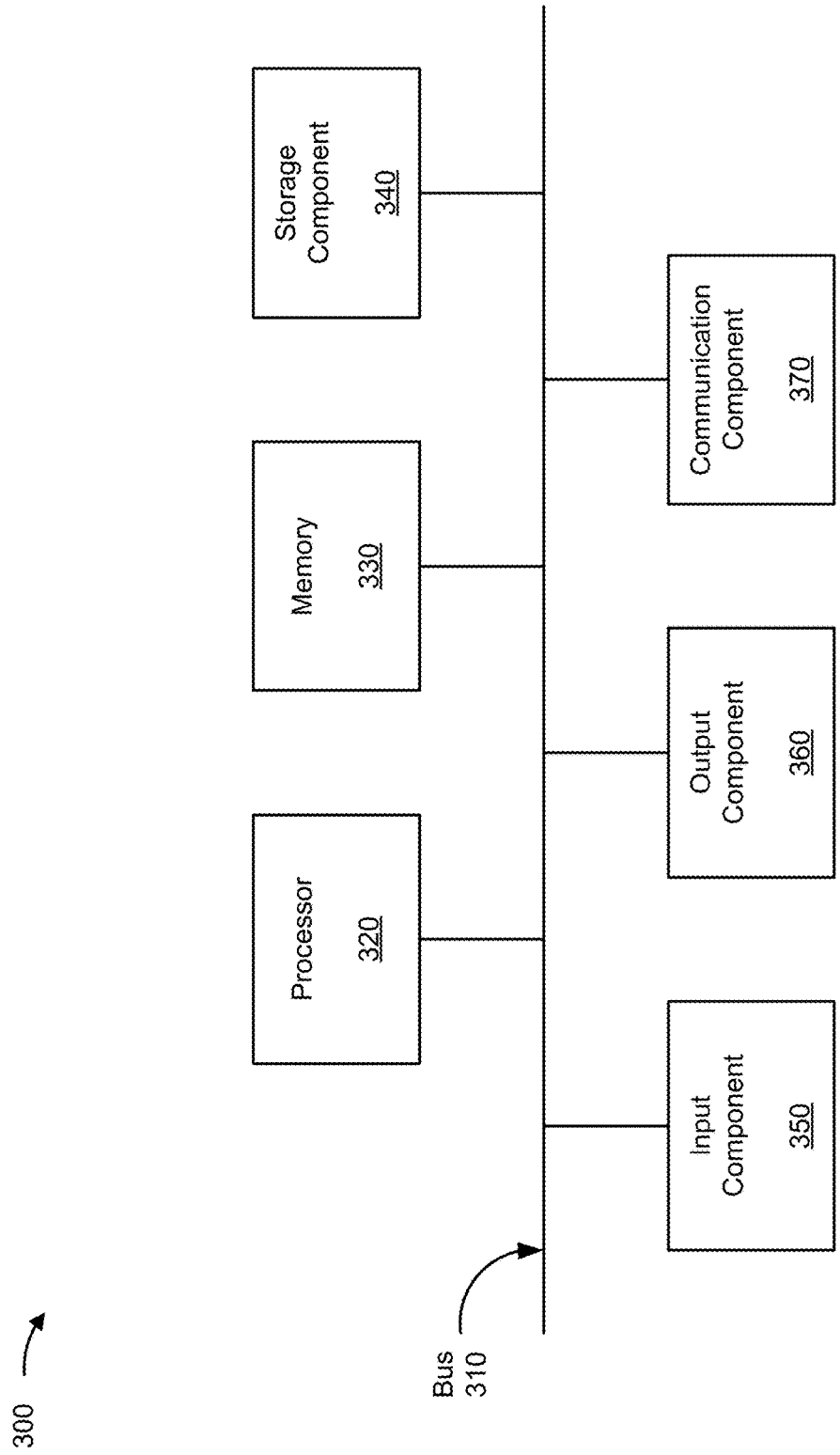
FIG. 3 is a diagram of example components of one or more devices of FIG. 2.

FIG. 3 is a diagram of example components of a device 300, which may correspond to 4G base station 105, FWA device 110, 5G base stations 115, and/or management system 120. In some implementations, 4G base station 105, FWA device 110, 5G base station 115, 5G base station 116, 5G base station 117, and/or management system 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
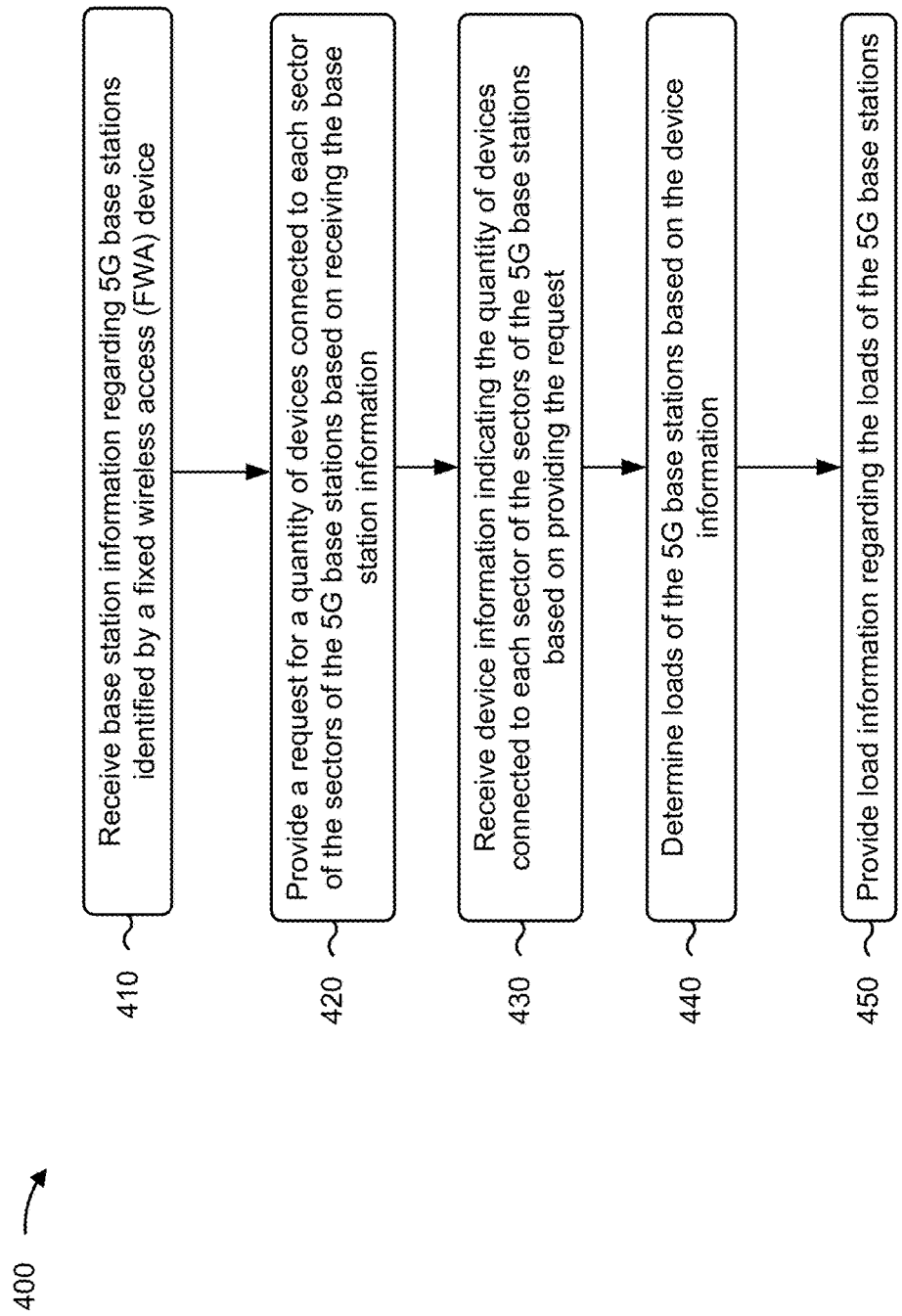
FIG. 4 is a flowchart of an example process relating to determining loads of 5G base stations (gNodeBs) that are to be connected to fixed wireless access devices.

FIG. 4 is a flowchart of an example process 400 associated with systems and methods for determining loads of base stations. In some implementations, one or more process blocks of FIG. 4 may be performed by a management system (e.g., management system 120). In some implementations, one or more process blocks of FIG. 4 may be performed by another device or a group of devices separate from or including the management system, such as a 4G base station (e.g., 4G base station 105), a FWA device (e.g., FWA device 110), and/or 5G base stations (e.g., 5G base station 115, 5G base station 116, and/or 5G base station 117). Additionally, or alternatively, one or more process blocks of FIG. 4 may be performed by one or more components of device 300, such as processor 320, memory 330, storage component 340, input component 350, output component 360, and/or communication interface 370.

As shown in FIG. 4, process 400 may include receiving, from a 4G base station, base station information regarding 5G base stations identified by an FWA device (block 410). For example, the management system may receive, from a 4G base station, base station information regarding 5G base stations identified by an FWA device, the base station information identifying the 5G base stations and identifying sectors of the 5G base stations, as described above.

As further shown in FIG. 4, process 400 may include providing, to the 5G base stations, a request for a quantity of devices connected to each sector of the sectors of the 5G base stations based on receiving the base station information (block 420). For example, the management system may provide, to the 5G base stations, a request for a quantity of devices connected to each sector of the sectors of the 5G base stations based on receiving the base station information, as described above.

As further shown in FIG. 4, process 400 may include receiving, from the 5G base stations, device information indicating the quantity of devices connected to each sector of the sectors of the 5G base stations based on providing the request (block 430). For example, the management system may receive, from the 5G base stations, device information indicating the quantity of devices connected to each sector of the sectors of the 5G base stations based on providing the request, as described above.

As further shown in FIG. 4, process 400 may include determining loads of the 5G base stations based on the device information (block 440). For example, the management system may determine loads of the 5G base stations based on the device information, as described above.

As further shown in FIG. 4, process 400 may include providing, to the 4G base station, load information regarding the loads of the 5G base stations (block 450). For example, the management system may provide, to the 4G base station, load information regarding the loads of the 5G base stations, the load information being provided to cause the 4G base station to determine the loads of the 5G base stations prior to causing a 5G base station, of the 5G base stations, to establish a connection with the FWA device, as described above.

In some implementations, process 400 includes ranking the 5G base stations based on the loads of the 5G base stations, and providing, to the 4G base station, information regarding the base stations ranked based on the loads of the 5G base stations.

In some implementations, receiving the base station information comprises receiving the base station information based on the 4G base station establishing an initial connection with the FWA device.

In some implementations, determining the loads of the 5G base stations comprises determining, based on the device information, a quantity of FWA devices that are connected to a sector of a particular 5G base station of the 5G base stations, and determining a load of the particular 5G base station based on the quantity of FWA devices.

In some implementations, determining the loads of the 5G base stations comprises determining the load of the particular 5G base station based on the quantity of FWA devices and a factor.

In some implementations, determining the loads of the 5G base stations comprises determining, based on the device information, a quantity of mobile devices that are connected to the sector of the particular 5G base station, and determining the load of the particular 5G base station based on the quantity of mobile devices and the quantity of FWA devices.

In some implementations, determining the loads of the 5G base stations comprises determining the load of the particular 5G base station based on the quantity of FWA devices, a first factor associated with the FWA devices, the quantity of mobile devices, and a second factor associated with the mobile devices.

In some implementations, determining the loads of the 5G base stations comprises determining a factor based on each service plan associated with the FWA devices, and determining the load of the gNodeB based on a quantity of FWA devices associated with a respective service plan and the factor determined for each service plan.

In some implementations, determining the loads of the 5G base stations comprises determining first factors based on service plans associated with the FWA devices; determining a second factor based on an amount of data consumed by the mobile devices; and determining the load of the gNodeB based on a quantity of FWA devices associated with a respective service plan, the first factors, the moving average of the quantity of mobile devices, and the second factor.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a management system, the method comprising:
   receiving, from a 4G base station, base station information regarding 5G base stations identified by a fixed wireless access (FWA) device,
   the base station information identifying the 5G base stations and identifying sectors of the 5G base stations;
   providing, to the 5G base stations, a request for a quantity of devices connected to each sector of the sectors of the 5G base stations based on receiving the base station information;
   receiving, from the 5G base stations, device information indicating the quantity of devices connected to each sector of the sectors of the 5G base stations based on providing the request;
   determining loads of the 5G base stations based on the device information; and
   providing, to the 4G base station, load information regarding the loads of the 5G base stations,
   the load information being provided to cause the 4G base station to determine the loads of the 5G base stations prior to causing a 5G base station, of the 5G base stations, to establish a connection with the FWA device.

2. The method of claim 1, further comprising:
   ranking the 5G base stations based on the loads of the 5G base stations; and
   providing, to the 4G base station, information regarding the 5G base stations ranked based on the loads of the 5G base stations.

3. The method of claim 1, wherein receiving the base station information comprises:
   receiving the base station information based on the 4G base station establishing an initial connection with the FWA device.

4. The method of claim 1, wherein determining the loads of the 5G base stations comprises:
   determining, based on the device information, a quantity of FWA devices that are connected to a sector of a particular 5G base station of the 5G base stations; and
   determining a load of the particular 5G base station based on the quantity of FWA devices.

5. The method of claim 4, wherein determining the loads of the 5G base stations comprises:
   determining the load of the particular 5G base station based on the quantity of FWA devices and a factor.

6. The method of claim 4, wherein determining the loads of the 5G base stations comprises:
   determining, based on the device information, a quantity of mobile devices that are connected to the sector of the particular 5G base station; and
   determining the load of the particular 5G base station based on the quantity of mobile devices and the quantity of FWA devices.

7. The method of claim 6, wherein determining the loads of the 5G base stations comprises:
   determining the load of the particular 5G base station based on the quantity of FWA devices, a first factor associated with the FWA devices, the quantity of mobile devices, and a second factor associated with the mobile devices.

8. A device, comprising:
   one or more processors configured to:
   receive a first request for information indicating a load of a gNodeB identified by a fixed wireless access (FWA) device connected to an eNodeB,
   the first request including base station information identifying the gNodeB and identifying a sector of the gNodeB;
   provide a second request for a quantity of devices connected to the sector of the gNodeB based on the first request;
   receive, based on the second request, device information indicating the quantity of devices connected to the sector of the gNodeB;
   determine a load of the gNodeB based on the device information; and
   provide, based on the first request, load information regarding the load of the gNodeB.

9. The device of claim 8, wherein the one or more processors, to provide the load information, are configured to:
   provide the load information to cause the eNodeB to determine the load of the gNodeB prior to causing the gNodeB to establish a connection with the FWA device.

10. The device of claim 8, wherein the one or more processors, to provide the load information, are configured to:
    cause the load information to be stored in a data structure of the eNodeB.

11. The device of claim 8, wherein the one or more processors, to determine the load, are configured to:
    determine, based on the device information, a quantity of FWA devices that are connected to the sector of the gNodeB; and
    determine the load of the gNodeB based on the quantity of FWA devices.

12. The device of claim 11, wherein the one or more processors, to determine the load, are configured to:
    determine a factor based on each service plan associated with the FWA devices; and
    determine the load of the gNodeB based on a quantity of FWA devices associated with each service plan and the factor determined for each service plan.

13. The device of claim 11, wherein the one or more processors, to determine the load, are configured to:
    determine, based on the device information, a quantity of mobile devices that are connected to the sector of the gNodeB;

determine a moving average of the quantity of mobile devices; and determine the load of the gNodeB based on the quantity of FWA devices and the moving average of the quantity of mobile devices.

14. The device of claim 13, wherein the one or more processors, to determine the load, are configured to:

determine first factors based on service plans associated with the FWA devices;

determine a second factor based on an amount of data consumed by the mobile devices; and determine the load of the gNodeB based on a quantity of FWA devices associated with each service plan, the first factors, the moving average of the quantity of mobile devices, and the second factor.

15. A non-transitory computer-readable medium storing a set of instructions, the set of instructions comprising:

one or more instructions that, when executed by one or more processors of a device, cause the device to:

receive a first request for information indicating a load of a first base station identified by a fixed wireless access (FWA) device connected to a second base station different than the first base station, the first request including base station information identifying the first base station and identifying a sector of the first base station;

provide a second request for a quantity of devices connected to the sector of the first base station based on the first request;

receive device information indicating the quantity of devices connected to the sector of the first base station based on the second request;

determine a load of the first base station based on the device information; and provide load information regarding the load of the first base station.

16. The non-transitory computer-readable medium of claim 15, wherein the one or more instructions, when executed by the one or more processors, further cause the device to:

receive the base station information based on the second base station establishing an initial connection with the FWA device.

17. The non-transitory computer-readable medium of claim 15, wherein the one or more instructions, that cause the device to provide the load information, cause the device to:

cause the load information to be stored in a data structure of the second base station.

18. The non-transitory computer-readable medium of claim 15, wherein the one or more instructions, that cause the device to determine the load, cause the device to:

determine, based on the device information, a quantity of FWA devices that are connected to the first base station; and determine the load of the first base station based on the quantity of FWA devices.

19. The non-transitory computer-readable medium of claim 18, wherein the one or more instructions, that cause the device to determine the load, cause the device to:

determine, based on the device information, a quantity of mobile devices that are connected to the first base station; and determine the load of the first base station based on the quantity of FWA devices and the quantity of mobile devices.

20. The non-transitory computer-readable medium of claim 15, wherein the one or more instructions, that cause the device to provide the load information, cause the device to:

provide, to the second base station, the load information to cause the second base station to determine the load of the first base station prior to causing the first base station to establish a connection with the FWA device.

\* \* \* \* \*